(12) United States Patent
Sora et al.

(10) Patent No.: US 6,312,046 B1
(45) Date of Patent: Nov. 6, 2001

(54) GROMMET AND FIXING STRUCTURE THEREOF

(75) Inventors: Masahiro Sora; Yoshiki Ogino; Mamoru Kawamata, all of Hiroshima-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/456,445

(22) Filed: Dec. 8, 1999

(30) Foreign Application Priority Data

Dec. 9, 1998 (JP) .................................................. 10-350396

(51) Int. Cl.⁷ .................................. B60J 5/00; H02G 3/00
(52) U.S. Cl. ........................ 296/208; 296/146.1; 296/152; 174/65 G; 174/152 G; 174/153 G
(58) Field of Search .................................. 296/152, 146.1, 296/208, 146.11, 146.12; 174/72 A, 70 R, 65 G, 152 G, 153 G, 151

(56) References Cited

U.S. PATENT DOCUMENTS

| | | | | |
|---|---|---|---|---|
| 2,494,814 | * | 1/1950 | Huth | 174/70 R |
| 2,931,851 | * | 4/1960 | Sims | 174/72 A |
| 2,988,725 | * | 6/1961 | Vallee | 439/566 |
| 3,808,586 | * | 4/1974 | Bevacqua | 174/72 A |
| 4,180,297 | * | 12/1979 | Abrams | 174/153 G |
| 4,656,689 | * | 4/1987 | Dennis | 174/153 G |
| 4,966,374 | * | 10/1990 | Oikawa et al. | 174/153 G |
| 5,300,734 | * | 4/1994 | Suzuki | 174/152 G |
| 5,405,672 | * | 4/1995 | Takiguchi et al. | 296/146.5 |
| 5,588,260 | * | 12/1996 | Suzuki et al. | 296/146.5 |
| 5,639,993 | * | 6/1997 | Ideno et al. | 174/153 G |
| 5,716,044 | * | 2/1998 | Peterson et al. | 296/152 |
| 5,792,995 | * | 8/1998 | Takeda et al. | 174/65 G |
| 5,856,635 | * | 1/1999 | Fujisawa et al. | 174/153 G |
| 5,886,300 | * | 3/1999 | Strickler | 174/65 G |
| 6,010,134 | * | 1/2000 | Katoh | 174/65 G |
| 6,051,790 | * | 4/2000 | Takeuchi et al. | 174/70 R |
| 6,064,003 | * | 5/2000 | Moore et al. | 174/152 G |
| 6,088,874 | * | 7/2000 | Nakata et al. | 174/153 G |

FOREIGN PATENT DOCUMENTS 02-37514 3/1990 (JP).
07-20021 4/1995 (JP).
08-318796 12/1996 (JP).

* cited by examiner

*Primary Examiner*—Stephen T. Gordon
*Assistant Examiner*—Hilary Gutman
(74) *Attorney, Agent, or Firm*—Finnegan, Henderson, Farabow, Garrett & Dunner, L.L.P.

(57) ABSTRACT

A grommet 110 includes a grommet body 111 and a grommet inner member 112. The inner member 112 has an elastic clip 116 in the form of an oval column and a waterproof lip 117 formed around a base part of the elastic clip 116. With this constitution, by press-fitting the elastically deformed clip 116 into an engagement hole 123 while accommodating the grommet 110 in a hollow part 122 formed on a side face 121 of a vehicle door, the easy and simple assembling can be accomplished to improve the waterproof capability.

15 Claims, 8 Drawing Sheets

GROMMET AND FIXING STRUCTURE THEREOF

BACKGROUND OF THE INVENTION

1. Field of the Invention

The present invention relates to a grommet and a fixing structure of the grommet. More particularly, it relates to a grommet to be used for the wiring of a vehicle door harness and a fixing structure of the grommet.

2. Description of the Related Art

A grommet used for the wiring of the vehicle door harness is shown in Japanese Unexamined Patent Publication (kokai) No. 8-318796, as shown in FIG. 1. In this figure, the grommet 1 is attached to a side face 21 of a door inner panel in a vehicle door 2, the side face 21 being arranged on a hinge attachment side of the door inner panel. The grommet 1 comprises a substantially-rectangular grommet body 11, a cylindrical part 12 projecting from the body 11 and allowing a door harness 3 to pass therethrough, and an attachment plate 13 insert-molded into the body 11 and made of synthetic resin, for attaching the body 11 to the side face 21. As shown in FIG. 2, the attachment plate 13 is provided with four claw-shaped clips 13A projecting from the inside of the body 11 outward. On the other hand, four engagement holes 21A are formed on the side face 21 of the door 2, for engagement with the clips 13A. On the back side of the grommet 11, a pair of lid parts 11A, 11A are formed for allowing the door harness 3 to be accommodated in the attachment plate 13 when the parts 11A, 11A are closed upon the arrangement of the door harness 3 therebetween.

On condition that the door harness 3 is accommodated in the attachment plate 13, the clips 13A of the grommet 1 are inserted into the engagement holes 21A on the side face 21 of the door 2, for fixing the grommet 1 to the door 2. As shown in FIGS. 1 and 3, a weather strip 4 is arranged along the side face 21 so as to pass over the grommet 1 fixed on the face 21.

In this grommet 1, however, there is a problem that the projecting amount of the clips 13A varies corresponding to the situation of the door harness 3 being accommodated in the plate 13 due to the arrangement where the clips 13A of the plate 13 are engaged in the engagement holes 21A in the side face 21 while interposing the door harness 3 between the attachment plate 13 and the lid parts 11A of the body 11. Therefore, the bonding force between the clips 13A and the engagement holes 21A is unstable. For example, if the door harness 3 is a collapsed one, then the projecting amounts of the clips 13A are increased to cause the grommet 1 to wobble with respect to the side face 21.

Additionally, since the above grommet 1 is fixed on the side face 21 through the plural (four) clips 13A, the wobbling may arise when even one clip 13A is not certainly engaged in the engagement hole 21A, so that a problem of easiness for water to permeate into the grommet 1 is caused. Therefore, it is necessary for a worker to assemble the grommet 1 with a skilled technique, so that the certain assembling cannot be effected quickly and easily.

Further, in the grommet 1, it is necessary to machine and form the plural engagement holes 21A in the side face 21 of the door 2, in positions corresponding to the clips 13A of the grommet 1, thereby causing the machining process of the door 2 to be complicated.

Further, since the conventional grommet 1 has the door harness 3 fixed thereon with no winding tapes, there arises a dispersion in the dimensions of the door harness 3, so that it may be easily slacked or pulled. In such a case, the resulting slack of the door harness 3 causes it to be caught by the closing or opening door 2. Alternatively, the pull of the door harness 3 causes it to be broken down. On the contrary, if desiring to fix the door harness 3 onto the grommet 1 with the winding tapes, then it is difficult for the worker to carry out the fixing operation of the door harness 3 on a flattened jig since the door harness 3 is L-shaped wired along the grommet 1. That is, in the conventional grommet 1, it is not easy to fix the door harness 3 on the grommet 1 by means of winding tapes.

SUMMARY OF THE INVENTION

Under such a circumstance, it is therefore an object of the present invention to provide a grommet which can be assembled to a panel constituting a door body quickly and which can simplify the processing of the door body, and a fixing structure for the grommet. Again, another object of the present invention is to provide a grommet which is advantageous in assembling the wire harness thereon and which facilitates the dimensional management of the wire harness and also reduces a possibility that the wire harness is bitten into the opening or closing door.

The objects of the present invention described above can be accomplished by a grommet to be attached on a panel constituting a vehicle, for holding a wire harness wired on the panel between a grommet body and the panel in waterproof manner, the grommet comprising;

an elastic clip to be inserted into an engagement hole formed in the panel, for engagement with the engagement hole, the elastic clip having a base part and being capable of deforming elastically; and a waterproof lip formed around the base part of the elastic clip;

wherein the elastic clip is formed so that a plane configuration thereof is larger than the engagement hole and the elastic clip is provided, on the base part, with a narrow part for contact with an opening margin of the engagement hole.

With the above constitution of the grommet, the engagement of the grommet with the panel can be accomplished by press-fitting the elastically deformed clip into the engagement hole formed in the panel. The mere insertion of the clip into the single engagement hole allows the grommet to be installed to the panel. Further, since the clip is larger than the engagement hole, the clip once elastically deformed and subsequently inserted into engagement hole does return to the original configuration on the hidden side of the engagement hole, while the panel portion around the engagement hole is engaged in the narrow part of the clip. Consequently, it becomes difficult to withdraw the grommet from the panel, whereby the grommet can be fixed on the panel securely.

In the above-mentioned grommet, the peripheral surface of the elastic clip may be tapered.

In this case, the tapered surface of the clip facilitates the worker's pushing the clip into the engagement hole thereby improving the workability in assembling the grommet to the panel.

The above-mentioned grommet may further comprise an inner member in the form of a cylindrical body allowing the wire harness to pass therethrough, wherein the elastic clip is formed on the inner member and the inner member is adapted so as to support the grommet body provided with a protection cylinder allowing the wire harness to pass therethrough.

In this case, it is possible to wire the wire harness through the inner member and the grommet body. Additionally, since the inner member and the grommet body can be provided independently of each other, it is possible to simplify the respective structures thereby reducing the manufacturing cost of the grommet.

In the above grommet, the inner member may be provided, on a lateral part thereof, with a flange part which is inserted into the grommet body.

In this case, the insertion of the flange part into the grommet body allows the inner member to be fixed to the grommet body with ease.

From another aspect of the invention, there is also provided a fixing structure for attaching a grommet on a panel constituting a vehicle, the fixing structure comprising:

the panel provided with a hollow part for accommodating the grommet in the panel, the hollow part having an engagement hole formed in a bottom of the hollow part; and the grommet provided with an elastic clip having a base part and a waterproof lip formed around the base part of the elastic clip;

wherein the elastic clip is pressure-fitted and engaged into the engagement hole, while the waterproof lip is brought into pressure contact with the panel's face around the engagement hole.

With the above constitution, owing to the accommodation of the grommet into the hollow part, it is possible to prevent the grommet from projecting from the panel's face. Further, since the installation is completed by inserting the clip into the single engagement hole, the processing of the panel can be simplified and the simple installation can be realized. Again, owing to the provision of the waterproof lip contacting with the panel under pressure, it is possible to prevent water from entering into the engagement hole.

In the above fixing structure, the periphery of the grommet may be brought into pressure contact with the periphery of the hollow part.

In this case, it is possible to improve the waterproof capability furthermore.

In the above fixing structure, the engagement hole may be in the form of an oblong hole while the elastic clip is shaped so as to be oval substantially.

In this case, it is possible to prevent the rotation and clattering of the grommet.

From yet another aspect of the invention, there is also provided a grommet to be attached on a panel constituting a vehicle, for holding a wire harness wired on the panel between the grommet and the panel in waterproof manner, the grommet comprising;

a grommet body formed so as to pass the wire harness therethrough;

a grommet inner cover provided with a cover piece which can pivot against the grommet body on condition that the cover piece is attached to a back face of the grommet body; and a grommet inner base to be arranged on the back side of the grommet inner cover and attached to the grommet body, the grommet inner base being provided with a bent piece which makes a designated angle to the back face of the grommet body when the grommet inner base is attached to the grommet body;

wherein, in the assembled condition of the grommet, the wire harness is interposed between the grommet inner cover and the grommet inner base, and the cover piece of the grommet inner cover is pivoted so as to overlap with the bent piece of the grommet inner base, so that the cover piece is carried by the bent piece.

In this case, it is possible to easily put a tape round the wire harness for fixture while arranging the cover piece of the grommet inner cover and the back face of the grommet body on the substantially identical level and possible to arrange the bundle of wire harness with respect to the grommet inner cover uniformly. Accordingly, according to the invention, it is possible to perform both wiring work and dimensional management for the wire harness. Further, by overlapping the grommet inner cover with the grommet inner base upon the wiring of the wire harness, it is possible to arrange it along the bent base piece at a predetermined angle to the back face of the grommet body.

In this grommet, the grommet inner cover may have a plurality of projections formed for preventing the wire harness from spreading.

Thus, when overlapping the grommet inner base with the grommet inner cover, it is possible to prevent the wire harness from being forced out of or bitten by the grommet inner base.

In the grommet described above, the grommet inner base may be provided, on a back face thereof, with an elastic clip for engagement with one engagement hole formed in the panel, the elastic clip having a base part and being capable of deforming elastically and a waterproof lip formed around the base part of the elastic clip, wherein the elastic clip is formed so that a plane configuration thereof is larger than the engagement hole and the elastic clip is provided, on the base part, with a narrow part for contact with an opening margin of the engagement hole.

Also in this case, by elastically deforming the clip formed in the grommet inner cover and press-fitting the clip into the engagement hole formed in the panel, the whole grommet can be engaged and fixed with the panel. In this invention, the mere insertion of the clip into the single engagement hole allows the grommet to be installed to the panel easily. Further, since the clip is larger than the engagement hole, the clip once elastically deformed and subsequently inserted into engagement hole does return to the original configuration on the hidden side of the engagement hole, while the panel portion around the engagement hole is engaged in the narrow part of the clip. Consequently, it becomes difficult to withdraw the grommet from the panel, whereby the grommet can be fixed on the panel securely.

These and other objects and features of the present invention will become more fully apparent from the following description and appended claims taken in conjunction with the accompany drawing.

DESCRIPTION OF THE PREFERRED EMBODIMENT

Embodiments of the present invention will be described with reference to drawings.

Figure 7:
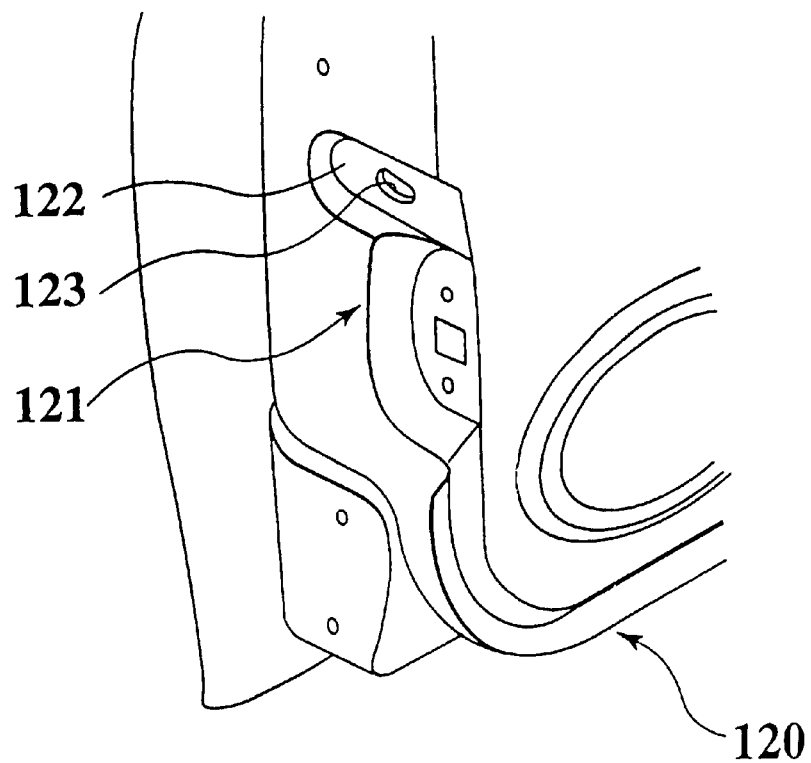
FIG. 7 is a perspective view showing a door structure of the first embodiment.

Prior to the descriptions about a grommet 110 of the first embodiment, we now describe a door structure for the grommet 110 in brief, with reference to FIG. 7.

As shown in FIG. 7, for attachment with the grommet 110, a vehicle door 120 has a hollow part 122 formed on a side face 121 of a door inner panel, the side face 121 being positioned on the side of a hinge attachment part of the inner panel. At a substantial center of the bottom of the hollow part 122, a clip engagement hole 123 is provided in the form of an oblong hole elongated in the direction of a door thickness. Note, the depth and profile of the hollow part 122 are respectively established so as to cope with the thickness and profile of the grommet 110 of the embodiment.

Figure 1:
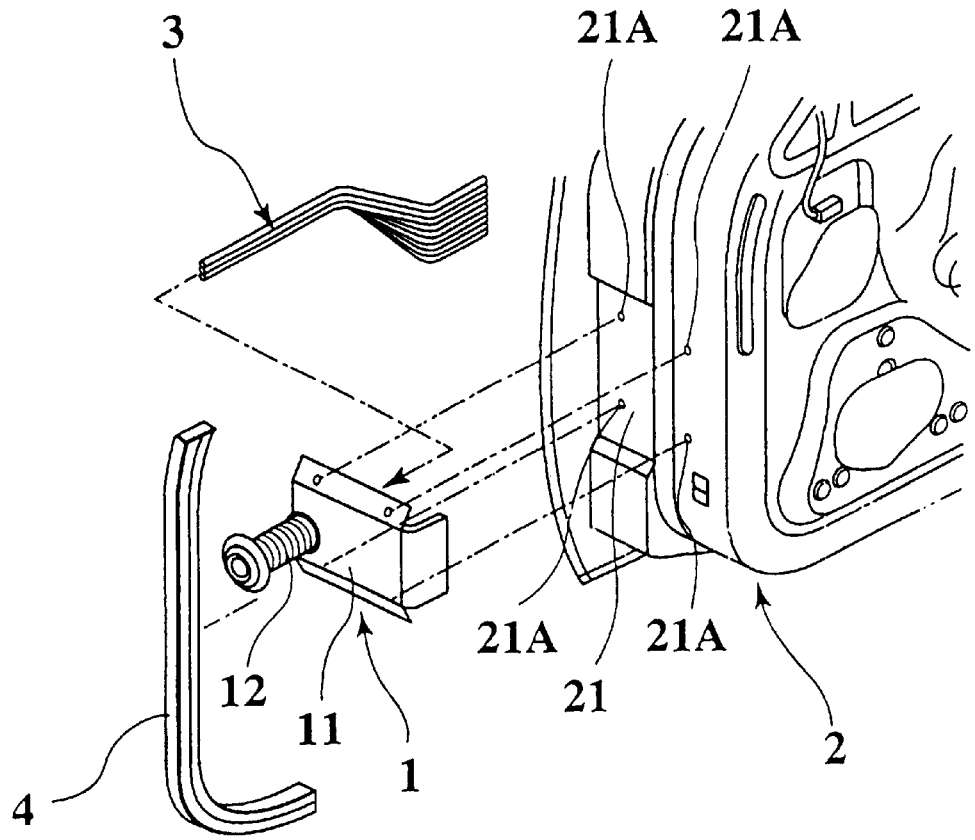
FIG. 1 is an exploded perspective view showing a condition that the conventional grommet is attached to a vehicle door.
Figure 2:
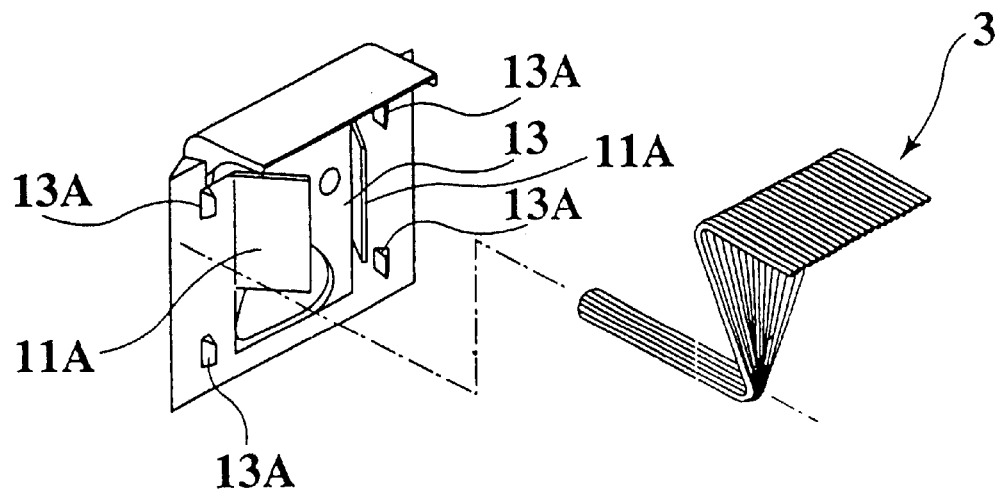
FIG. 2 is a perspective view showing a condition that a wire harness is attached to the conventional grommet.
Figure 3:
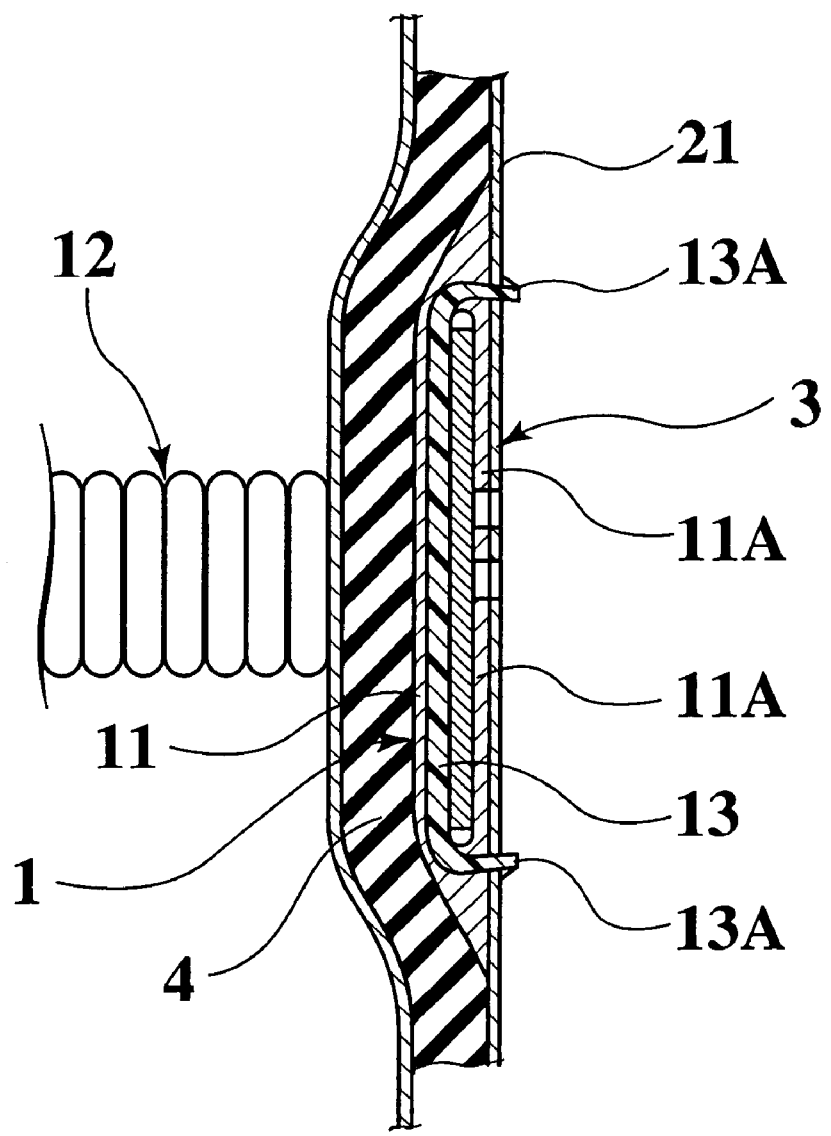
FIG. 3 is a sectional view showing the conventional grommet being attached to the vehicle door.
Figure 4:
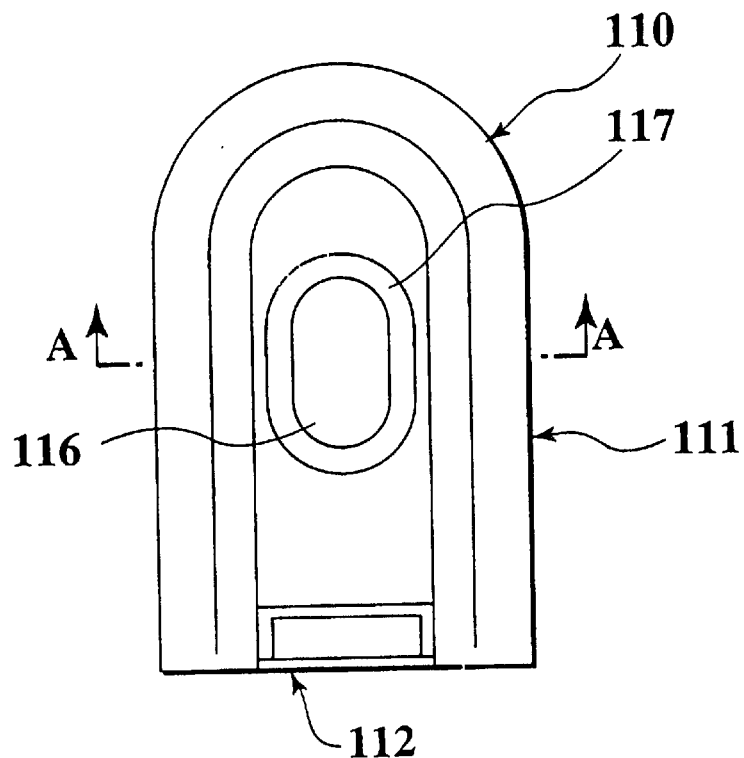
FIG. 4 is a plan view of the grommet in accordance with the first embodiment of the invention.
Figure 5:
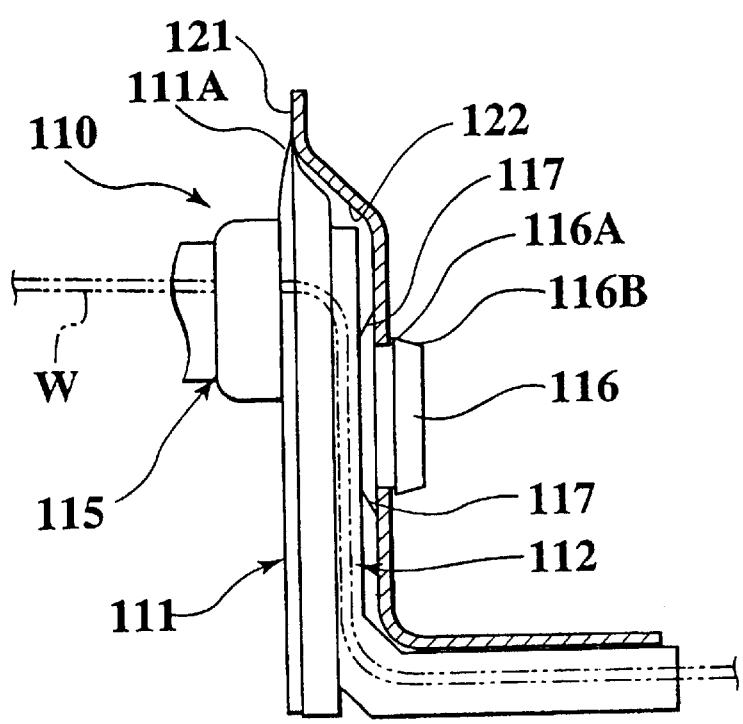
FIG. 5 is a side sectional view of FIG. 4.
Figure 6:
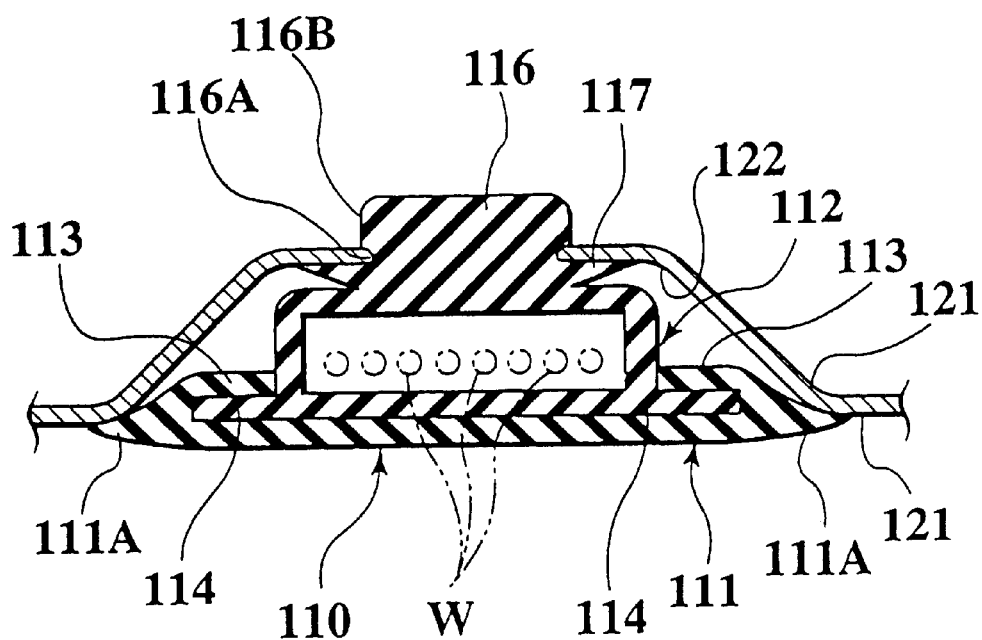
FIG. 6 is a cross sectional view taken along a line of A—A of FIG. 4.

The structure of the grommet 110 will be described hereinafter. As shown in FIGS. 4 to 6, the grommet 110 of the first embodiment is mainly constituted by a grommet body 111 and a grommet inner member 112 fixed on the side of the vehicle door. The grommet body 111 is made of e.g. rubber composite material, on one hand. On the other hand, the grommet inner member 112 is made of resinous material which can deform elastically.

The plane configuration of the grommet body 111 of the embodiment is in the form of a plate having one side shaped in semicircular and the other side shaped in rectangular. Along the periphery of the grommet body 111 besides its margin on the side of the other end, an inside piece 113 is arranged so as to overlap with an inside face of the body 111 by a predetermined width, as shown in FIG. 6. Further, on the outer side of the piece 113, it is also formed integrally with the grommet body 111. Inserted between the inside piece 113 and the inside face of the grommet body 111 is a flange part 114 of the inner member 112 which will be described later. On one side of the grommet body 111, a flexible harness protecting cylinder 115 is formed for allowing a vehicle harness (door harness) W to pass therethrough, as shown in FIG. 5.

The grommet inner member 112 is provided in the form of a flattened rectangular cylinder bent at right angles and adapted so as to allow a wire harness W for vehicles to pass therethrough. On one side of the so-bent inner member 112 and on its periphery of the side, a flange part 114 is formed to be inserted into the inside face of the grommet body 111 and the inside piece 113. The flange part 114 is inserted into the grommet body 111 and held therein. In a position on the grommet inner member 112 corresponding to the harness protecting cylinder 115 formed on the grommet body 111, an opening (not shown) is formed so as to communicate with the cylinder 115.

As shown in FIGS. 5 and 6, the inner member 112 is provided, on its face against the door inner panel, with a projecting clip 116 which is to be inserted into the clip engagement hole 123 in the hollow part 122 formed on the side face 121. The clip 116 is positioned in the inner member's part corresponding to a substantial center of the grommet body 111. On a base part of the clip 116, a waterproof lip 117 is formed so as to go around the clip 116. The clip 116 is provided, on a base part thereof, with a narrow part 116A and also shaped so as to be a generally-oval column. The long axis of the oval-shaped clip 116 is established in parallel with the longitudinal direction of the grommet body 111. Further, the clip 116 is formed so that its profile in plan view is larger than the clip engagement hole 123. The clip 116 has a tapered circumferential face 116B formed for facilitating its insertion into the clip engagement hole 123. In the establishment, when the clip 116 is engaged into the clip engagement hole 123, the waterproof lip 117 comes in pressure contact with the hollow part 122.

Figure 8:
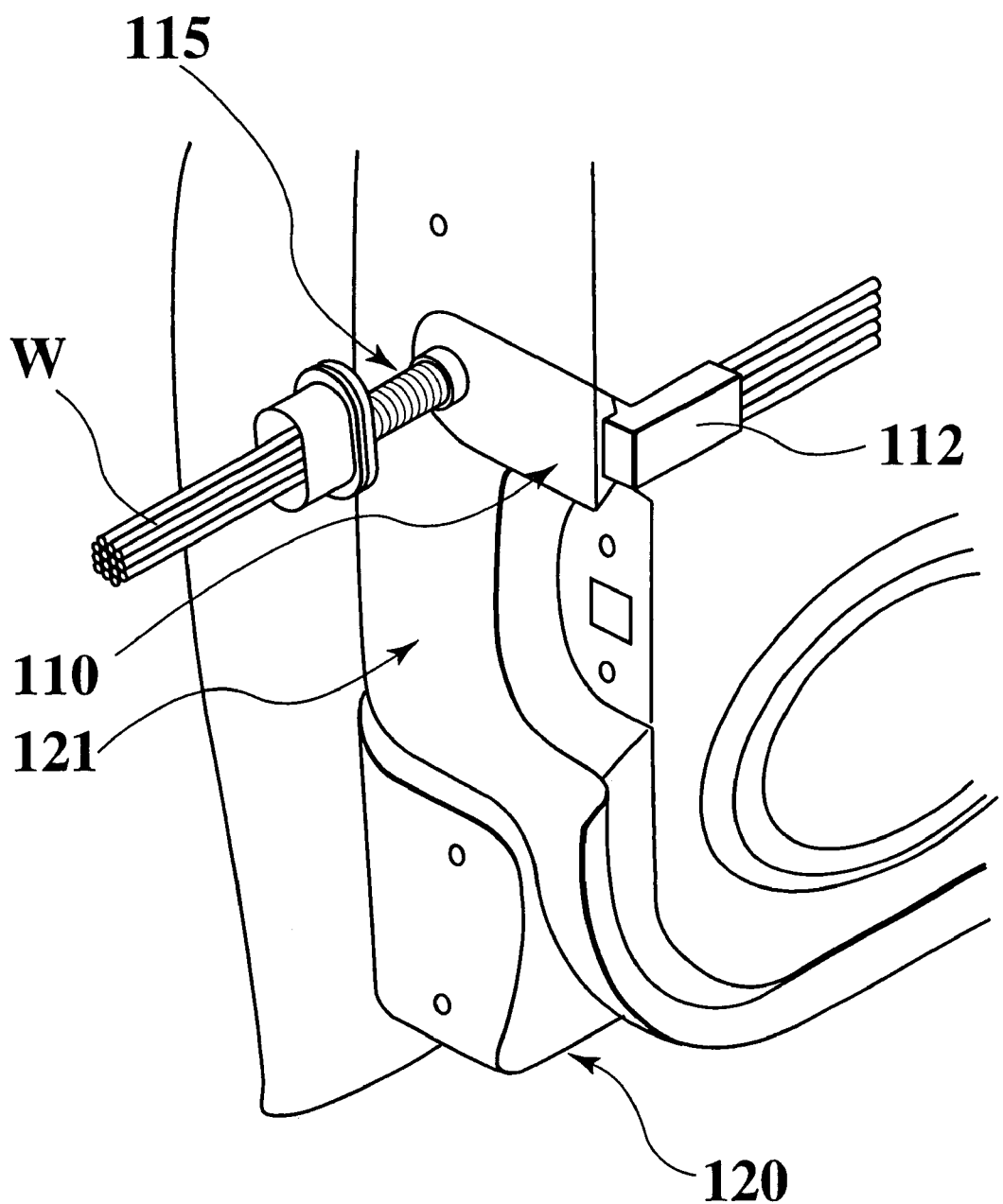
FIG. 8 is a perspective view showing a condition that the grommet of the first embodiment is attached to the vehicle door.

In order to fit the so-constructed grommet 110 to the side face 121 of the door 120, an assembling worker has only to urge the clip 116 against the clip engagement hole 123. FIG. 8 shows a condition that the grommet 110 is fitted on the side face 121 of the vehicle door 120 upon the completion of wiring the wire harness W.

Under the fitting condition shown in FIG. 8, since a peripheral part 111A of the body 111 comes into pressure contact with the side face 121 of the door 120 while the waterproof lip 117 is urged on the bottom of the hollow part 122, the grommet 110 of the embodiment is capable of enhancing the watertight capability. Further, owing to the oval configurations of the clip 116 and the engagement hole 123 for receiving it, it is possible to prevent the rotation of the grommet 110, whereby the clatter of the grommet 110 can be prevented with respect to the door 120. The provision of the single clip 116 allows the grommet 110 to be fitted in the door 120 by the worker's just and simple manipulating of the grommet 110. Additionally, owing to the formation of the hollow part 122 having a profile corresponding to the grommet 110, it is possible to restrict it from projecting from the side face 121, thereby improving the appearance of the side face 121.

Moreover, the clip 116 is large-sized so that the base part is not fragile. Therefore, even if the grommet 110 is again detached from the side face 121 after being fitted to the door 120, there is no possibility of damaging the clip 116, so that a fitting strength required for the grommet 110 could be maintained in spite of its repetitive installations. Therefore, it is possible to improve the maintenance capability of the grommet 110 during the exchange or repair of the wire harness W. Further, owing to the arrangement where the clip 116 is positioned at a substantial center of the grommet body 111, it comes into uniform contact with the side face 121 along the periphery of the body 111. Thus, it is possible to restrict the occurrence of bending on the periphery of the body 111, thereby improving the waterproof capability furthermore.

[2nd. Embodiment]

FIGS. 9 to 13 show the second embodiment of the invention. A grommet 210 of the embodiment is generally constituted by a grommet body 211, a grommet inner cover 212 and a grommet inner base 213.

As similar to the above-mentioned grommet body 111 of the first embodiment, the plane. configuration of the grommet body 211 is in the form of a plate having one side shaped in semicircular and the other side shaped in rectangular. Along a periphery 211A of the grommet body 211, an inside piece 214 is arranged so as to overlap with an inside face of the body 211 by a predetermined width. Further, on the outer side of the body 211, the inside piece 214 is also formed integrally with the grommet body 211. Inserted between the inside piece 214 and the inside face of the grommet body 211 is an inserting plate 215 of the inner cover 212 which will be described later. On one side of the outer face of the grommet body 211, a flexible harness protecting cylinder 216 is formed for allowing a vehicle harness (door harness) W to pass therethrough.

The grommet inner cover 212 is constituted by the inserting plate 215 and a cover piece 217 integrally connected to the plate 215 through a hinge part 218. Further, the inserting plate 215 is provided with engagement ribs 215A for both preventing the wire harness W from being forced out of the plate 215 and engaging with the grommet inner base 213, and engagement projections 215B for engagement with the harness W. Similarly, the cover piece 217 is provided with engagement ribs 217A for both preventing the wire harness W from being forced out of the piece 217 and engaging with the grommet inner base 213, and engagement projections 217B for engagement with the harness W.

Figure 10:
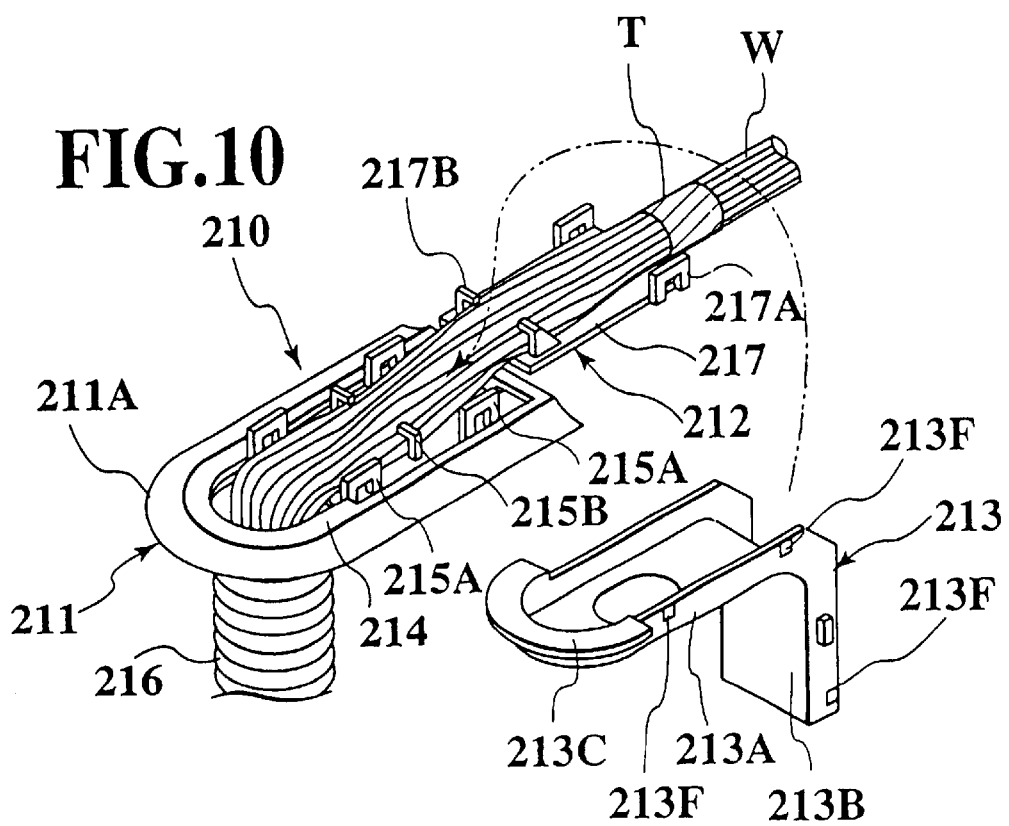
FIG. 10 is an exploded perspective view showing the grommet of the second embodiment.
Figure 11:
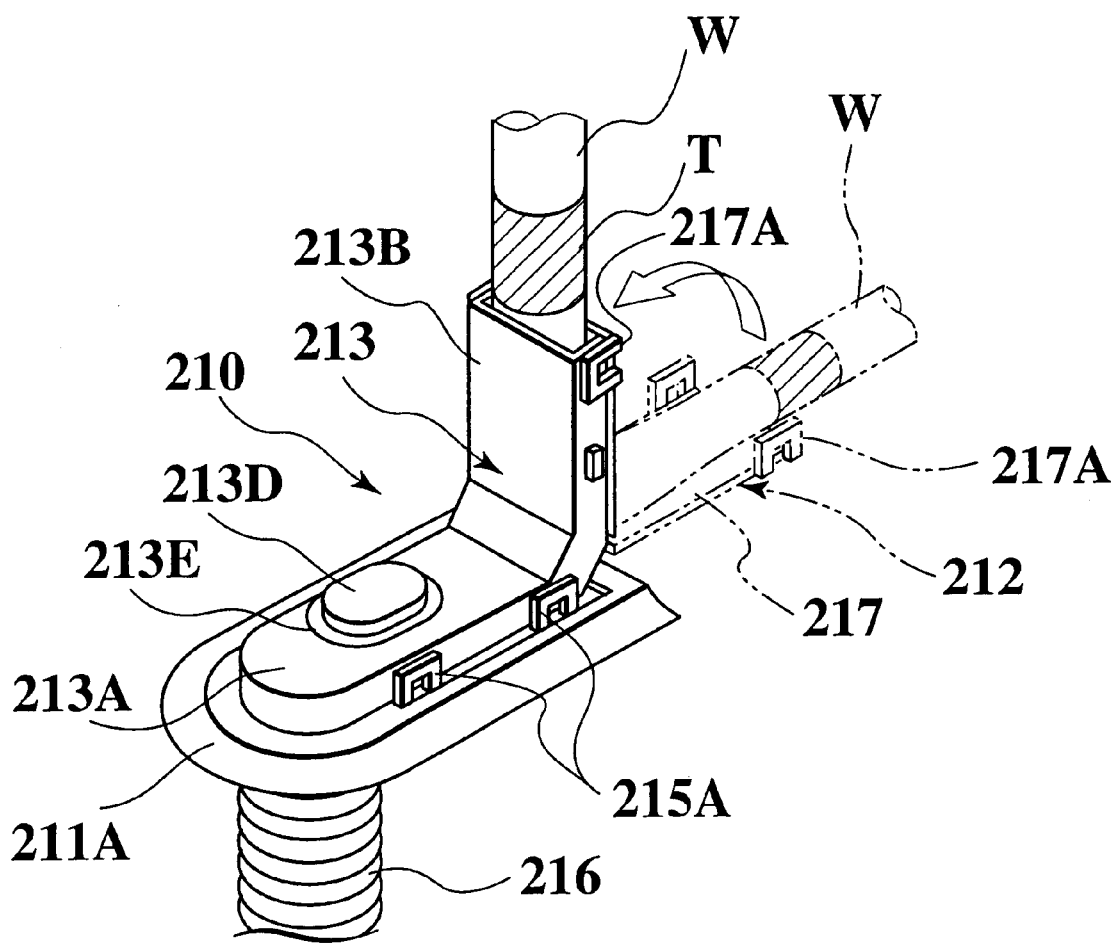
FIG. 11 is a perspective view showing the assembling work of the grommet of the second embodiment.
Figure 12:
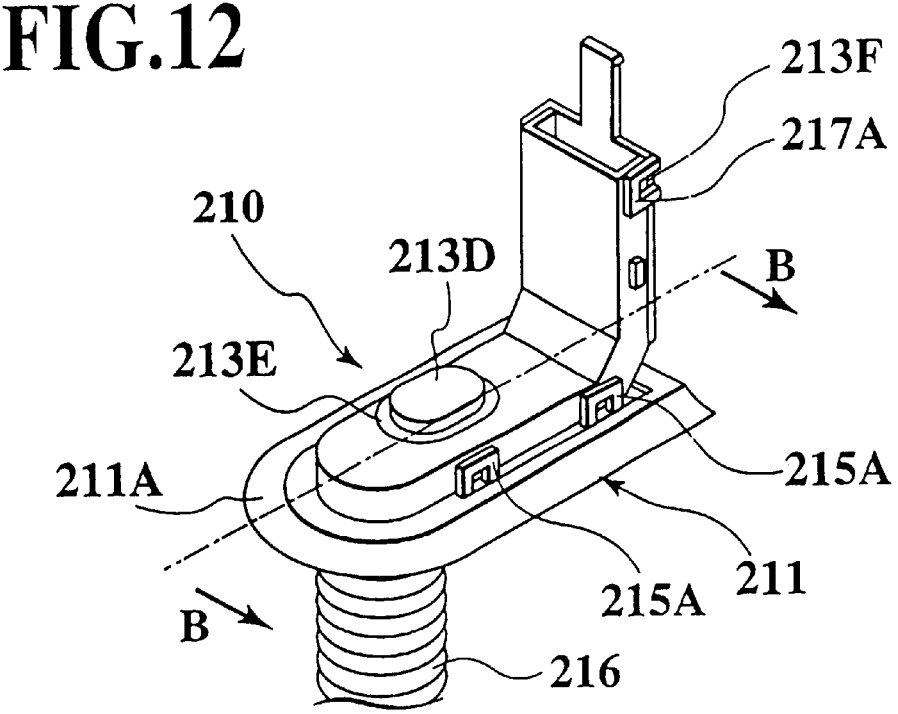
FIG. 12 is a perspective view of the grommet of the second embodiment.
Figure 13:
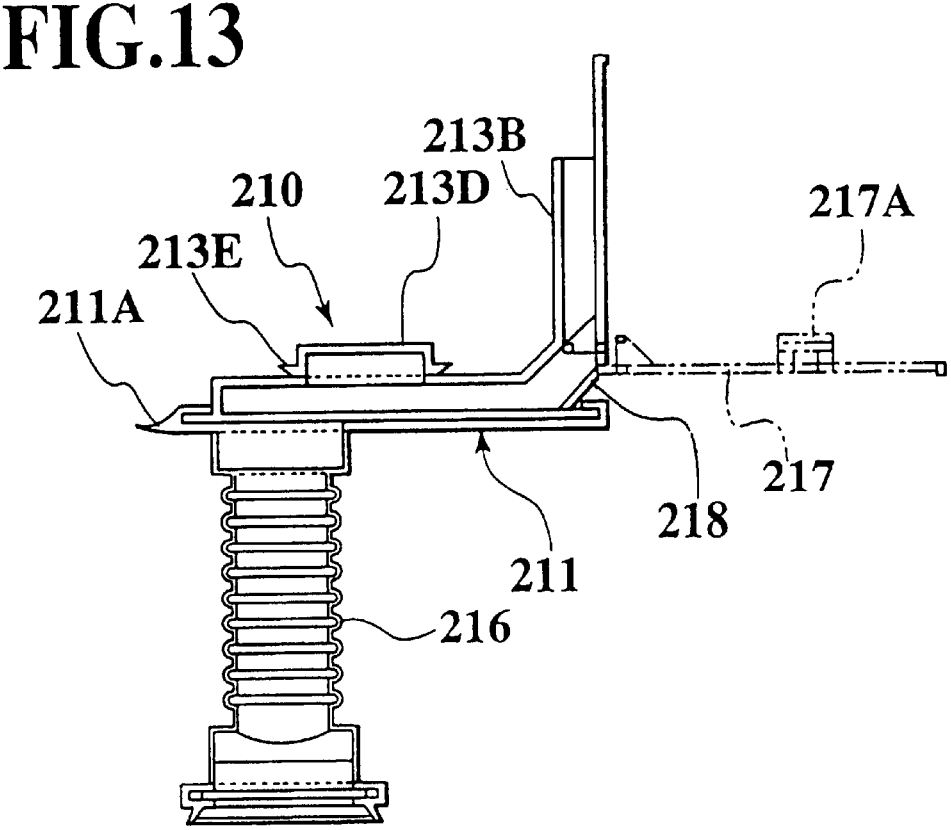
FIG. 13 is a cross sectional view taken along a line of B—B of FIG. 12.

The grommet inner base 213, which is substantially L-shaped in its side view, is fitted to a back opening of the grommet body 211. The inner base 213 includes an installation plate 213A provided, at a center of the back face, with a projecting clip 213D and a base piece 213B bent to a direction substantially perpendicular to the plate 213A. About a base part of the clip 213D, as shown in FIGS. 11 to 13, a waterproof lip 213E is formed so as to go round the base part. As shown in FIG. 10, on both sides of the inner base 213, engagement projections 213F are respectively formed for engagement with the engagement ribs 215A, 217A of the inner cover 212. Additionally, the installation plate 213A is provided, on an end thereof, with a flange part 213C which is to be inserted into the interior of the inside piece 214 with a semicircular opening.

Figure 9:
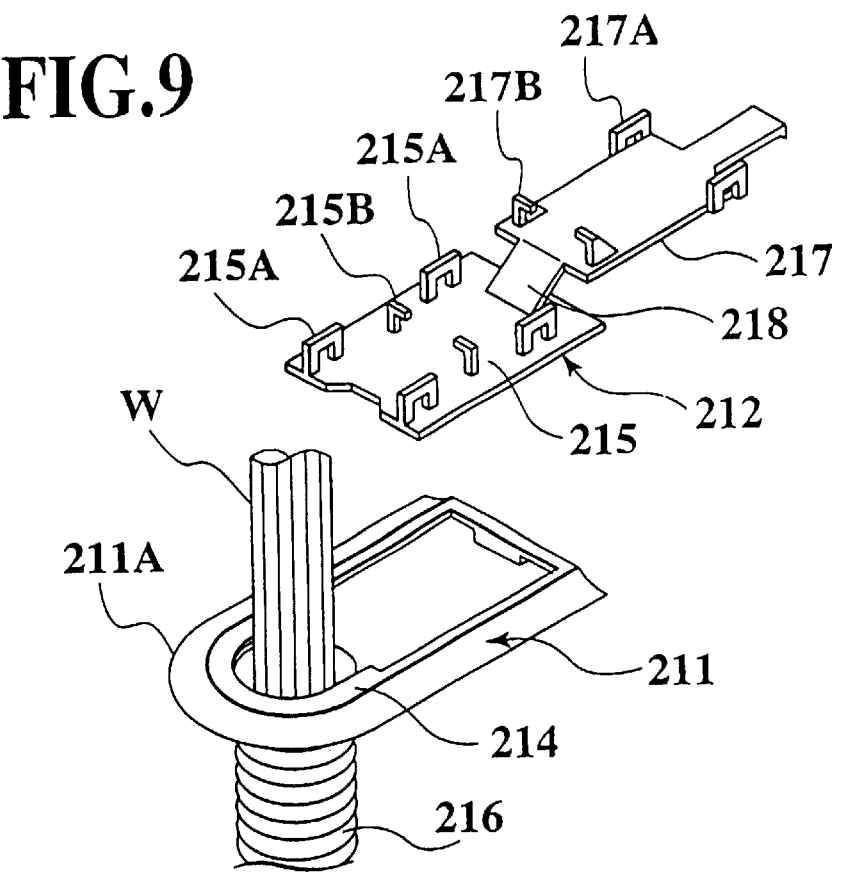
FIG. 9 is an exploded perspective view showing the grommet in accordance with the second embodiment of the invention.

We now describe the installation steps of the so-constructed grommet 210. As shown in FIG. 9, after inserting the vehicle harness W into the protecting cylinder 216 of the grommet body 211, the inserting plate 215 of the inner cover 212 is inserted and fitted to the body 211, from its back side. Next, it is carried out to engage lateral sides of the harness W in a bundle with the engagement projections 215B, 217B. Note, at this step, the wiring is carried out under condition that the inserting plate 215 and the cover piece 217 are both arranged so as to be on the same plane through the hinge part 218. In this way, owing to the wiring operation of the harness W on the substantially identical level, it facilitates the dimensional management of the wire harness W. Furthermore, as shown in FIG. 10, it is also easy to put a tape T around the harness W for fixture. Thereafter, as shown in FIG. 11, it is executed to insert the installation plate 213A of the inner base 213 into the grommet body 211 for closing the opening and simultaneously engage the engagement projections 213F in the engagement ribs 215A. Subsequently, by bending the cover piece 217 so as to overlap with the bent base piece 213B, the assembling of the grommet 210 is completed as shown in FIG. 12. Note, FIG. 13 is a sectional view of the completed grommet 210, taken along a line B—B of FIG. 12.

The so-constructed grommet 210 is capable of improving the workability in assembling the wire harness and making it easy to manage the dimensions of the wire harness W. Furthermore, it is possible to reduce the possibility of the wire harness W being bitten by the door at its closing or opening.

The present invention is not limited to the above-mentioned embodiments and various changes and modifications may be made in connection with the constitution of the invention. For example, although the flange part 114 of the grommet inner member 112 is inserted into the grommet body 111 in the shown embodiment, the body 111 and the inner member 112 may be formed into one body by adopting appropriate material for them. Further, although the longitudinal direction of the clip 116 is parallel with the longitudinal direction of the grommet body 111, the former may be perpendicular to the latter in the modification.

Although the grommet is installed in the panel constituting the vehicle door in common with the above-mentioned embodiments, it goes without saying that the grommet of the invention may be installed in a panel constituting the vehicle body. Further, although the grommet of the described embodiments is made of rubber composite, it may be made of other synthetic resins having flexibility. Note, even in this case, it is necessary that the clip is made of elastic material.

What is claimed is:

1. A grommet for holding a wire harness between a grommet body and a panel of a vehicle in waterproof manner, the panel having an engagement hole formed therein, the grommet comprising:

an inner member configured to be attached to the grommet body and to allow the wire harness to pass therethrough, the inner member having an elastically deformable clip having a plane configuration larger than the engagement hole formed thereon;

a narrow part provided on a peripheral surface of the clip; and a waterproof lip formed around a base part of the clip;

wherein the narrow part is configured to engage with the engagement hole to attach the grommet to the panel and the waterproof lip is configured to contact an area around the engagement hole when the clip is inserted into the engagement hole.

2. A grommet as claimed in claim 1, wherein the peripheral surface of the clip is tapered.

3. A grommet as claimed in claim 1, wherein the inner member is provided, on a lateral part thereof, with a flange part configured to be inserted into the grommet body.

4. A grommet as claimed in claim 1, wherein the inner member is an L-shaped rectangular cylinder.

5. A grommet as claimed in claim 1, wherein the clip is oval-shaped.

6. A grommet as claimed in claim 1, wherein the grommet body includes a protection cylinder configured to allow the wire harness to pass therethrough.

7. A fixing structure for attaching a grommet on a panel of a vehicle, the fixing structure comprising:

a hollow part provided in the panel for accommodating the grommet in the panel the hollow part having an engagement hole formed in a bottom portion thereof;

an inner member configured to be attached to a grommet body and to allow the wire harness to pass therethrough, the inner member having an elastically deformable clip formed thereon; and a waterproof lip formed around a base part of the clip;

wherein the waterproof lip is configured to be brought into pressure contact with the bottom portion of the hollow part around the engagement hole when the clip is pressure-fitted into the engagement hole.

8. A fixing structure as claimed in claim 7, wherein the grommet body has a peripheral part configured to be brought into pressure contact with a periphery of the hollow part when the clip is pressure-fitted into the engagement hole.

9. A fixing structure as claimed in claim 7, wherein the engagement hole is in the form of an oblong hole while the elastic clip is oval-shaped.

10. A fixing structure as claimed in claim 5, wherein the clip includes a narrow part provided on a peripheral surface thereof and the narrow part is configured to engage with the engagement hole when the clip is pressure-fitted into the engagement hole.

11. A fixing structure as claimed in claim 10, wherein the peripheral surface of the clip is tapered.

12. A fixing structure as claimed in claim 7, wherein the clip has a plane configuration larger than the engagement hole.

13. A fixing structure as claimed in claim 7, wherein the inner member is provided, on a lateral part thereof, with a flange part configured to be inserted into the grommet body.

14. A grommet for holding a wire harness between a grommet body and a panel of a vehicle in waterproof manner, the panel having an engagement hole formed therein, the grommet comprising:

an inner member formed integral with the grommet body and configured to allow the wire harness to pass therethrough, the inner member having an elastically deformable clip having a plane configuration larger than the engagement hole formed thereon;

a narrow part provided on a peripheral surface of the clip; and a waterproof lip formed around a base part of the clip;

wherein the narrow part is configured to engage with the engagement hole to attach the grommet to the panel and the waterproof lip is configured to contact an area around the engagement hole when the clip is inserted into the engagement hole.

15. A fixing structure for attaching a grommet on a panel of a vehicle, the fixing structure comprising:

a hollow part provided in the panel for accommodating the grommet in the panel, the hollow part having an engagement hole formed in a bottom portion thereof;

an inner member formed integral with a grommet body and configured to allow the wire harness to pass therethrough, the inner member having an elastically deformable clip formed thereon; and a waterproof lip formed around a base part of the clip;

wherein the waterproof lip is configured to be brought into pressure contact with the bottom portion of the hollow part around the engagement hole when the clip is pressure-fitted into the engagement hole.

* * * * *